United States Patent
Lee et al.

(10) Patent No.: US 7,451,149 B2
(45) Date of Patent: Nov. 11, 2008

(54) EXTRANET ACCESS MANAGEMENT APPARATUS AND METHOD

(75) Inventors: Se Hyun Lee, Seoul (KR); Young Jun Ryu, Seoul (KR); Sung Kwang Moon, Seoul (KR)

(73) Assignee: Nets Co., Ltd., Seoul (KR)

( * ) Notice: Subject to any disclaimer, the term of this patent is extended or adjusted under 35 U.S.C. 154(b) by 96 days.

(21) Appl. No.: 10/578,634

(22) PCT Filed: Nov. 8, 2004

(86) PCT No.: PCT/KR2004/002874

§ 371 (c)(1),
(2), (4) Date: May 8, 2006

(87) PCT Pub. No.: WO2005/048526

PCT Pub. Date: May 26, 2005

(65) Prior Publication Data
US 2007/0124482 A1 May 31, 2007

(30) Foreign Application Priority Data
Nov. 14, 2003 (KR) ................... 10-2003-0080752

(51) Int. Cl.
G06F 7/00 (2006.01)
G06F 17/30 (2006.01)
G06F 15/16 (2006.01)

(52) U.S. Cl. .............................. 707/9; 707/9; 709/227; 709/228; 709/229

(58) Field of Classification Search ............. 707/1–206
See application file for complete search history.

(56) References Cited

U.S. PATENT DOCUMENTS

| | | | |
|---|---|---|---|
| 6,161,139 A * | 12/2000 | Win et al. ................ | 709/225 |
| 6,182,142 B1 * | 1/2001 | Win et al. ................ | 709/229 |
| 6,453,353 B1 * | 9/2002 | Win et al. ................ | 709/229 |
| 6,490,624 B1 * | 12/2002 | Sampson et al. ........... | 709/227 |
| 6,519,647 B1 | 2/2003 | Howard et al. | |
| 6,584,505 B1 | 6/2003 | Howard et al. | |
| 6,609,128 B1 * | 8/2003 | Underwood .............. | 707/10 |
| 6,728,884 B1 * | 4/2004 | Lim ....................... | 726/12 |
| 2002/0138577 A1 * | 9/2002 | Teng et al. ................ | 709/205 |
| 2003/0079120 A1 | 4/2003 | Hearn et al. | |
| 2003/0105862 A1 * | 6/2003 | Villavicencio ............. | 709/225 |
| 2003/0172145 A1 * | 9/2003 | Nguyen .................. | 709/223 |

FOREIGN PATENT DOCUMENTS

JP 2002-278930 9/2002

* cited by examiner

*Primary Examiner*—Mohammad Ali
*Assistant Examiner*—Angelica Ruiz
(74) *Attorney, Agent, or Firm*—Thelen LLP

(57) ABSTRACT

Managing access to an extranet for an extended service provider (xSP) includes decentralizing the role of access management by using cached access control list (ACL) information, and synchronizing decentralized access management roles using an authentication and authorization (AA) server. Insufficiency of session management is overcome by adopting authentication/authorization based on a web browser cookie.

4 Claims, 7 Drawing Sheets

[Fig. 1]
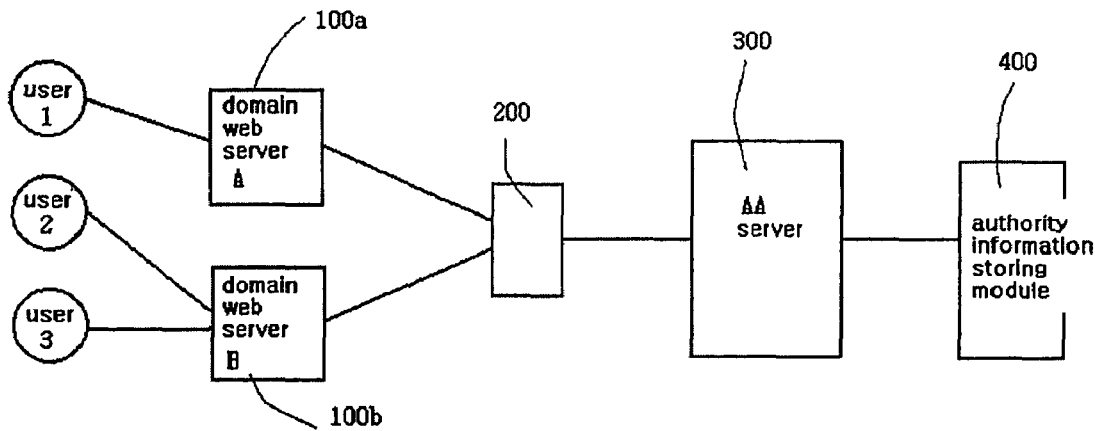
[Fig. 2]
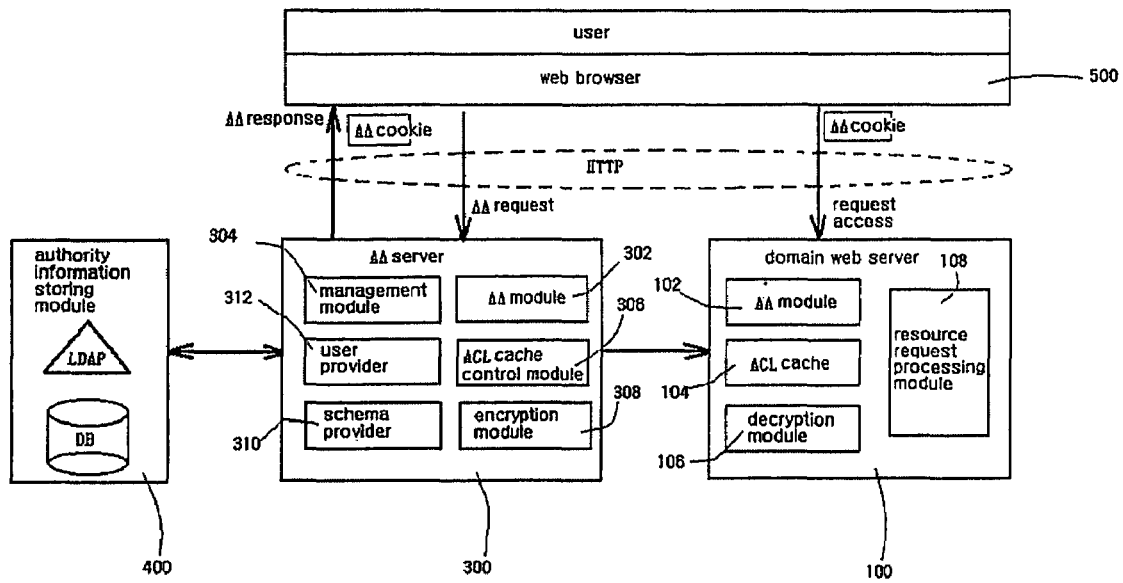

[Fig. 3]
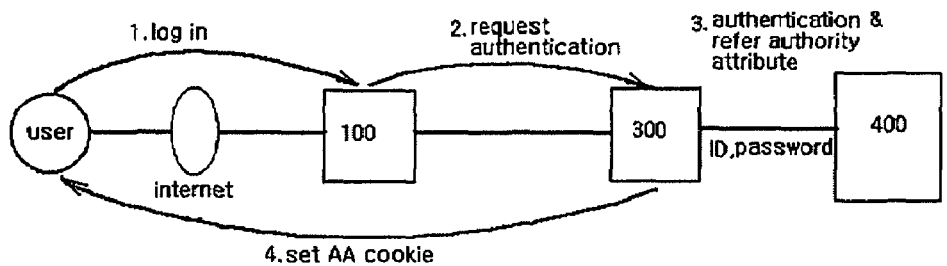
[Fig. 4]
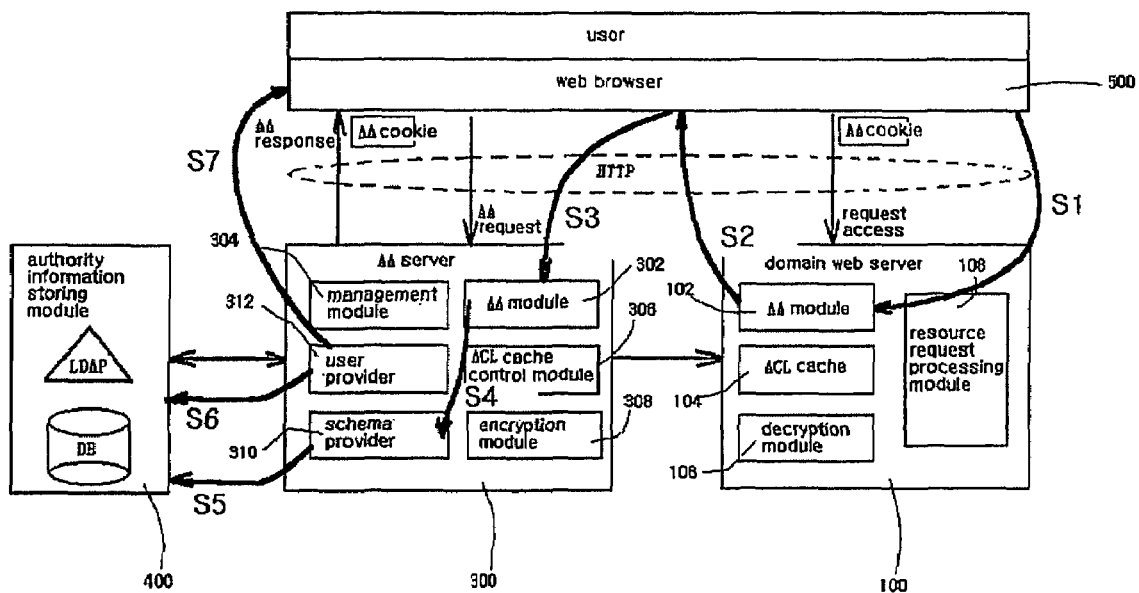

[Fig. 5]
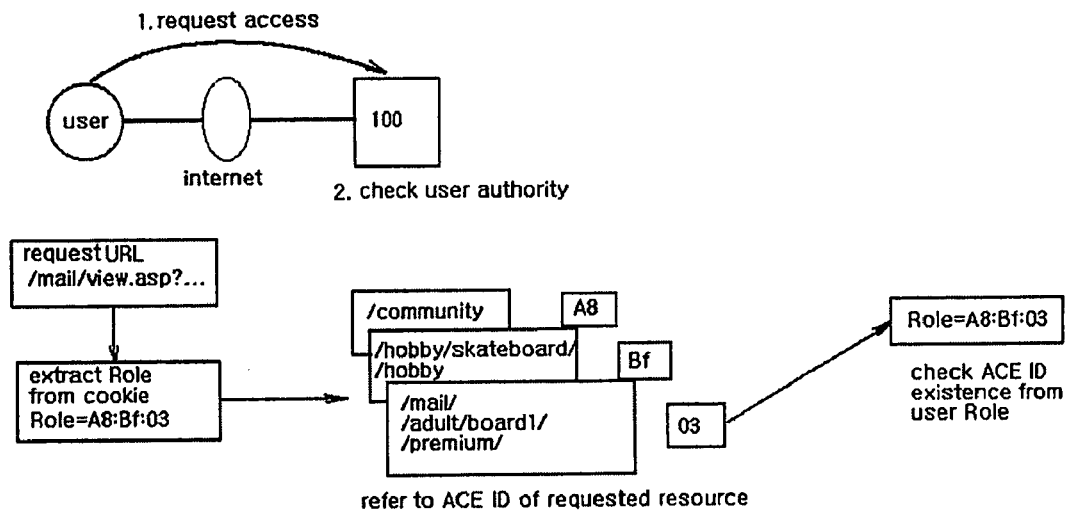
[Fig. 6]
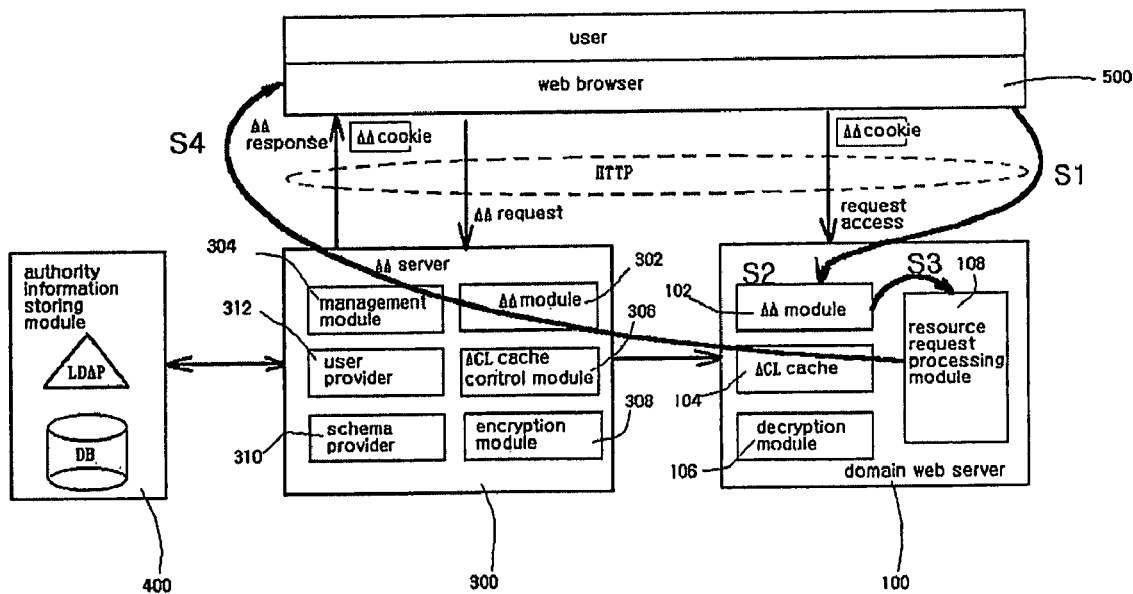

[Fig. 7]
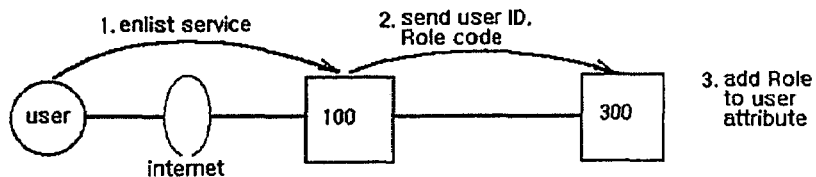
[Fig. 8]
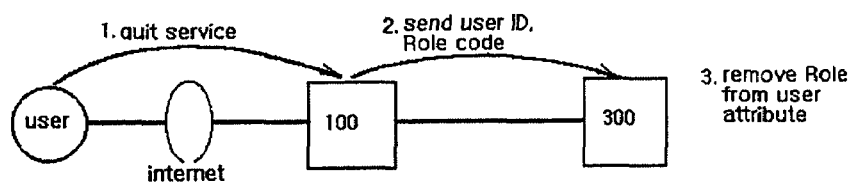
[Fig. 9]
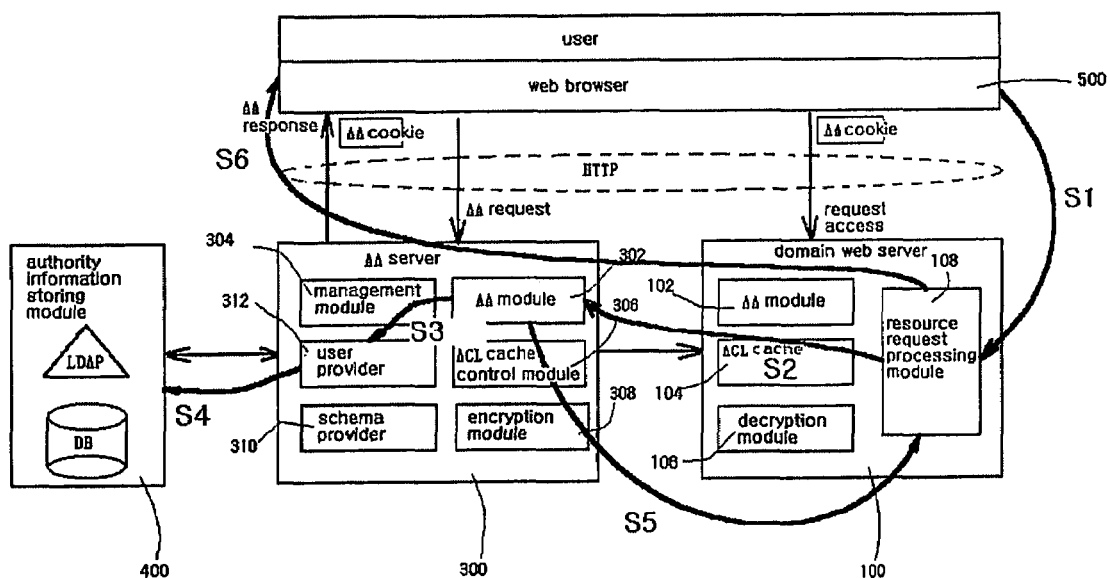

[Fig. 10]
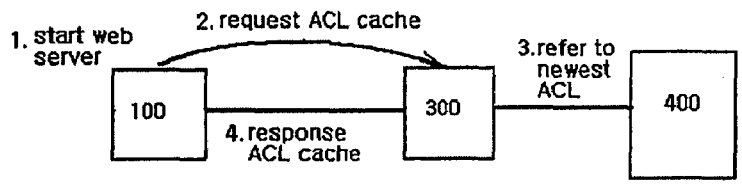
[Fig. 11]
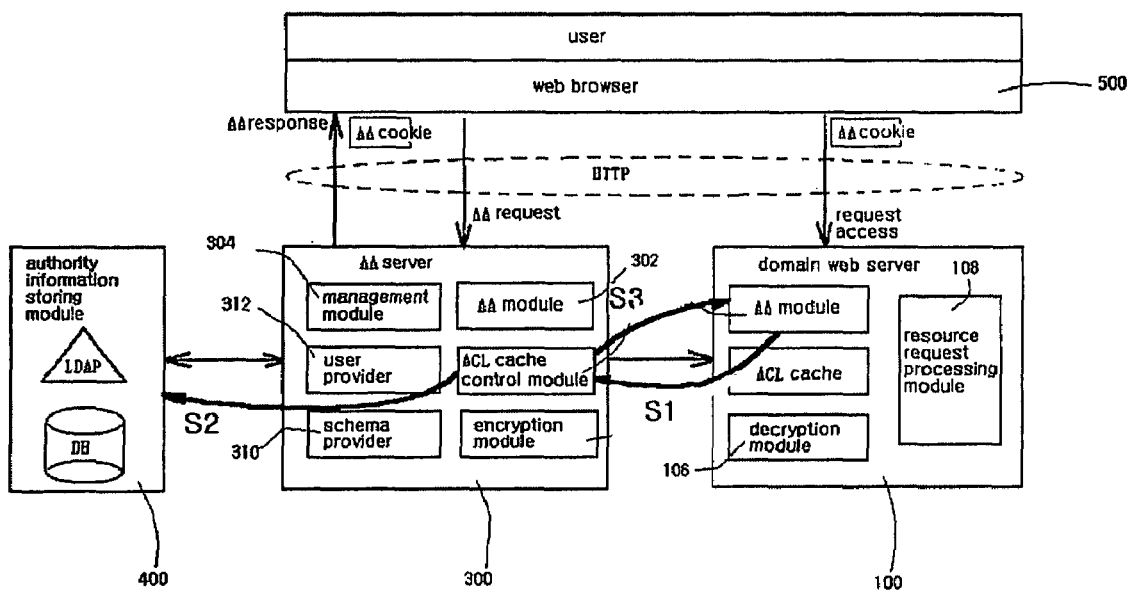
[Fig. 12]
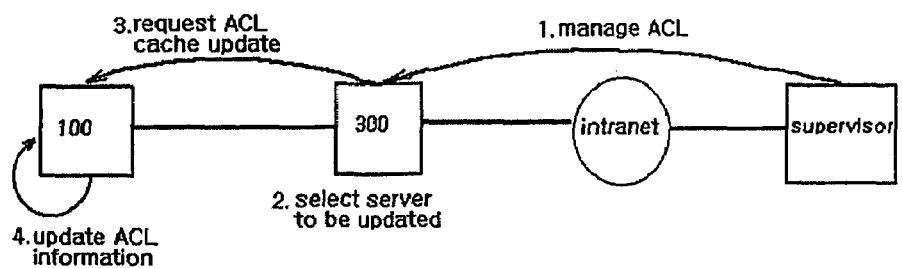

[Fig. 13]
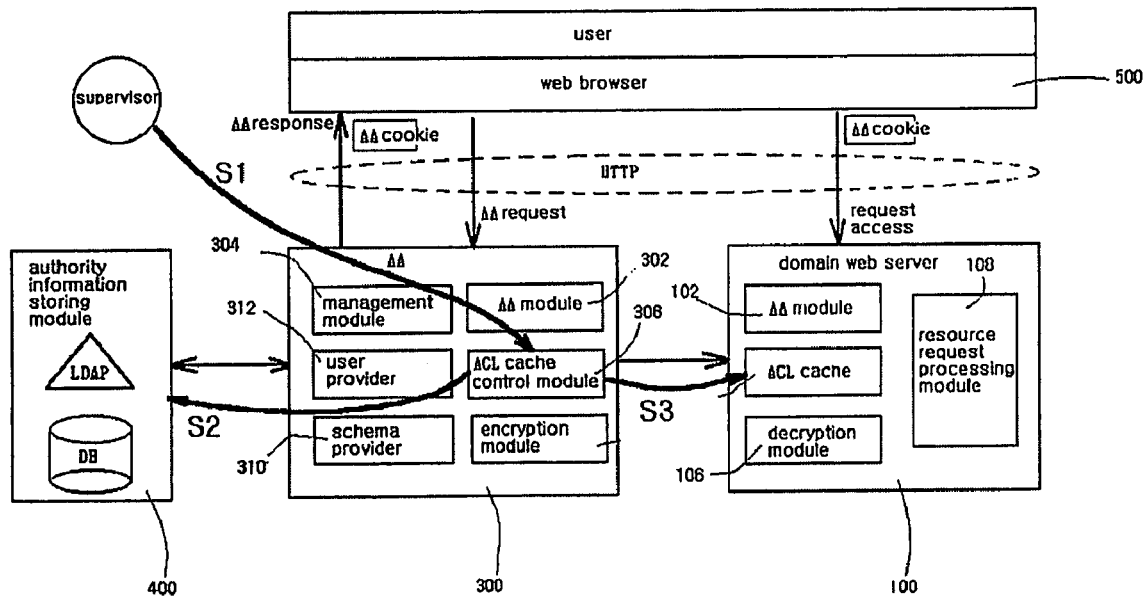
[Fig. 14]
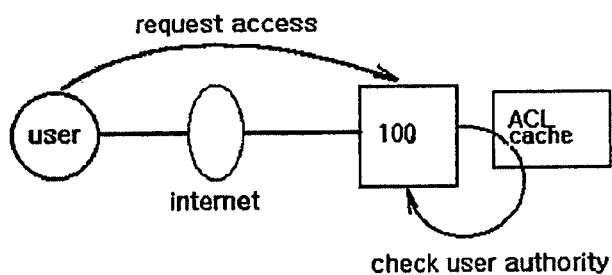
[Fig. 15]
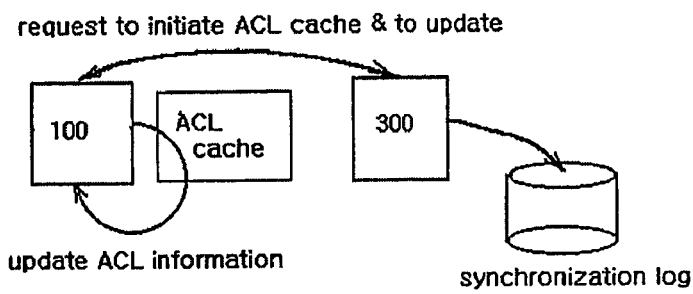

[Fig. 16]
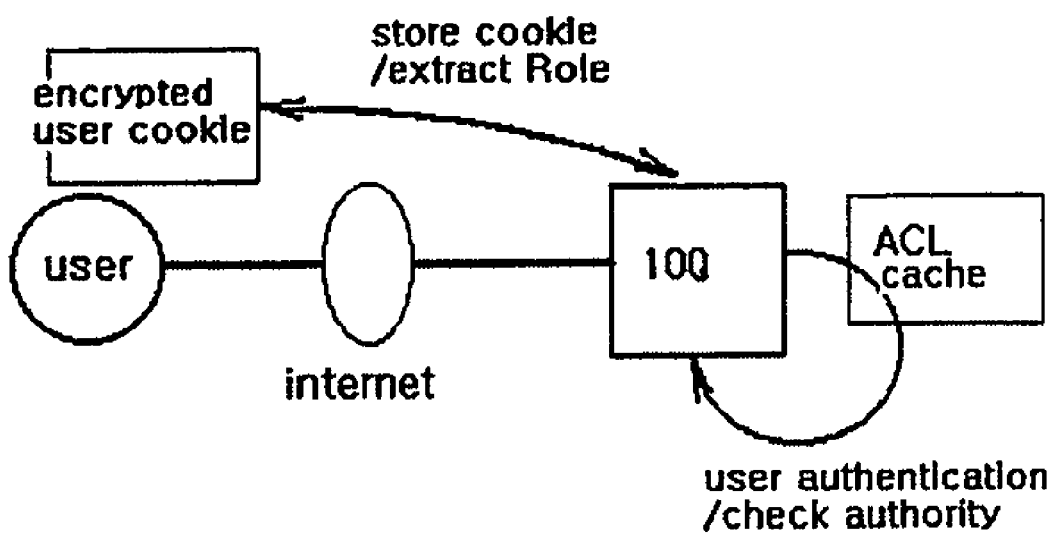

EXTRANET ACCESS MANAGEMENT APPARATUS AND METHOD

CROSS-REFERENCE TO RELATED APPLICATION

This application claims priority based on International Patent Application No. PCT/KR2004/002874, entitled "Extranet Access Management Apparatus and Method" by inventors Se Hyun LEE, Young Jun RYU, and Sung Kwang MOON, which claims priority of Korean Application No. 10-2003-0080752, filed on Nov. 14, 2003, and which was published in English.

TECHNICAL FIELD

The present invention relates to an access management apparatus and method for managing or controlling access to an extranet for xSP.

BACKGROUND ART

Conventionally, managing a user in xSP (extended service provider) was based on a simple authentication scheme. However, as online markets prevail, development of new markets became necessary. Particularly, the necessity of managing the access according to roles and resources becomes important.

Conventional products, such as access managing solutions or packages, are targeted to a small scale portal site or in-house intranet. These products not only are expensive but have low efficiency, because they adopt a real-time centralized management scheme and have a complicated hierarchical structure, and because limited users can use them.

The drawbacks of the conventional access managing method will be detailed.

(1) Extreme network traffic because of a centralized authority management

A central management server between a web server and a directory (or DB) server plays a role of real-time management for session and access. The central management server checks the request signals received from all of the users and grants the authority. Therefore, this is suitable only for an in-house intranet or a small scale portal site, which has a small number of users and small amount of usage. In addition, considering the properties of xSP (i.e., user number more 10 million, simple hierarchical structure, and frequent network usage), this centralized management model requires excessive maintenance costs for solving the performance degradation due to a large scale network traffic.

(2) Instability of authority cache

Generally, to overcome the drawback of the centralized management, "authority cache" is added. This can improve processing performance by reducing a network traffic by processing itself in the pertinent web server on the request of the same resources or users. However, it is inevitable that it is impossible to be simplified and it is difficult to control the cache size to a stable service, and thus it should need a long term trial-and-error.

(3) Inefficiency of session management

Since the sessions for all the users are managed by the central server, the centralized management model is suitable only for a small scale intranet model. For real-time session management, it requires large cookies greater than kB-unit. However, in the properties of xSP, centralized session management and extremely large cookies are very inefficient in the network load or server availability aspect.

From the foregoing, it is needed a new type of access management solution that satisfies the requirements of large scale and high performance.

DISCLOSURE OF INVENTION

It is an object of the present invention to provide a high performance apparatus and method for managing authentication and access to a large scale portal site.

Definition of the terminology:

ACE(access control entry)—Access controlling entries, such as ID, name, site domain, server list, resource list, changed URL, description, etc.

ACL(access control list)—List of ACEs

ACL cache—Memory space for application variable that a domain web server stores the ACL Role—Set of ACEs that a user can access. A user Role can be defined by using the authority attributes of a user schema. Reduction policy of the Role information is necessary, since the amount of Role information to be stored in cookie is increased as the ACE increases in quantity. In the case of storing the Role as ACE ID list, if ACE list is assigned by a human readable name, the amount of information is remarkably augmented. Therefore, if ACE ID is expressed by a series of 62-decimal number text string of [a-zA-Z0-0], the amount of information can be reduced. That, is, in the case of 2 digits, 3,844 Role information can be expressed, and in the case of 3 digits, 238,828 Role information can be expressed (for example, it is expressed as Role=A0:B2:cZ:Ku:Z3: . . . ). Role is stored in an AA cookie when in user authentication.

User schema—Storage structure defines various user attributes, such as ID, password, etc.

AA(authentication and authorization) server—Plays a role of user authentication, Role set, ACL cache synchronization AA cookie—Cookie including a user's authentication and authority information To overcome "the problems of centralized authority and authorization cache", the present invention decentralizes the role of access management by using ACL cached, and synchronizes the decentralized access management roles by using an AA server. In addition, it overcomes "inefficiency of session management" by adopting authentication/authorization based on a web browser cookie, and it additionally includes the functions of supporting the internet security standard, and processing a variety of security/encryption techniques and a user-defined access management.

FIG. 1 shows a brief construction of the access management apparatus of the present invention. Each of the domain web server(100*a*, 100*b*, . . . ), to which a plurality of users are subscribed, checks the authority of users by using ACL information, respectively. As a result, if the domain web server produces the encrypted Role information cookie, this cookie signal passes a load-balancing/fault-tolerance module 200, and authenticated in an AA server 300. After authentication, Role, ACL, and ACE information is stored in an authority information storing module 400.

The technical features of the present invention are as follows.

Decentralization of a role of access management by using ACL cache (see FIG. 14): A conventional caching policy was inefficient because the authority of once-requested resource is all stored. In the present invention, the role of access management is distributed to the respective domain web servers 100 by simplifying (or symbolizing) the ACL and storing it in a lump as the ACL cache. Therefore, network traffic between access managing servers is minimized. That is, each the respective domain web server 100 manages its own ACL cache and process access management by itself.

Synchronization of the decentralized roles of access management by using an AA server (see FIG. 15): As the access management role is distributed, it is necessary to automatically synchronize the ACL caches between the servers. For this, like FIG. 15, whenever the web server 100 is started, the ACL cache is initiated from the AA server 300. If the ACL is changed by a supervisor, the ACL cache information of the relevant web server 100 is updated in real-time to keep the synchronization. In addition, the AA server 300 controls ACL synchronization log such that trouble shooting and maintenance can be easily achieved.

Management of authentication and authorization by using user web browser cookies (see FIG. 16): It is improper for a server to manage large scale user's sessions. Therefore, according to the present invention, manages user sessions by using encrypted user web browser cookies, and thereby the server load is minimized.

From the foregoing, the present invention performs high-speed authentication by using the cookies along with standard http protocol, stores and manages, when in authentication, simplified (or symbolized) Role as a cookie. By doing so, the present invention manages access by using the ACL cache and Role of cookies of the domain web server 100.

BRIEF DESCRIPTION OF THE DRAWING

The above and other objects, features, and advantages of the present invention will become more apparent from the following description when taken in conjunction with the accompanying drawings, in which:

FIG. 1 shows an overall systematic structure of the present invention,

FIG. 2 shows a detailed structure of the present invention,

FIGS. 3 and 4 show the procedure of authenticating,

FIGS. 5 and 6 show the procedure of referring the authority,

FIGS. 7 to 9 show the procedure of changing the authority,

FIGS. 10 to 13 show the procedure of synchronizing an ACL cache,

FIG. 14 shows a concept of distributing the role of access management using the ACL cache, FIG. 15 shows a concept of synchronizing the distributed role of access management using an AA server, and FIG. 16 shows a concept of managing authority and access using a user web browser cookies.

PREFERRED EMBODIMENTS FOR CARRYING OUT THE INVENTION

Now construction and operation of an access management apparatus will be discussed in detail. FIG. 2 shows a detailed unique construction out of the brief system shown in FIG. 1. In it, a domain web server 100, an AA server 300, and an authority information storing module 400 are interconnected. A user web browser 500 is interconnected with the AA server 300 and a domain web server 100 by means of HTTP technique.

In FIG. 2, the AA server 300 comprises an AA module 302 playing a role of authentication and authorization; a management module 304 for managing the whole system of the present invention and the authorization policy; an ACL cache control module 306 for synchronizing ACL caches of the respective domain web server 100 with the AA server 300; an encryption module 308 for encrypting AA cookies to be given to the users; a schema provider 310 and user provider 312 for providing an operation system independent of the authority information storing module 400.

The domain web server 100 comprises an AA module 102 for checking, by using the ACL cache, whether the user accesses; an ACL cache 104 which is delivered from the AA server 300; a decryption module 106 for decrypting the encrypted AA cookies; a module 108 for processing a resource request from the user web browser 500.

As will be explained in FIGS. 14 to 16, the request and response operation between the user web browser 500, the AA server 300, and the domain web server 100 is performed by the AA cookies.

The operation of the apparatus constructed as above will be explained. The operation of the apparatus of the present invention substantially corresponds to that of the method category of the present invention, and so the operation of the access management apparatus of FIG. 2 will be explained along with the access management method of the present invention.

First of all, FIG. 3 shows an authorizing procedure in authentication. When a user logs in the domain web server I 00 through the internet, the domain web server 100 requests an authentication from the AA server 300. Then the AA server 300 refers, using the user ID and password, the authority information storing module 400 to authentication attributes and user authority attributes. After referring, the AA server 300 sets Role value in the user browser by the AA cookie (for example, Role=A0:K1:z8:03).

The functional process flow of the procedure shown in FIG. 3 is illustrated in FIG. 4. If the user web browser 500 accesses the domain web server 100 [S1], the AA module 102 of the domain web server 100 confirms access authority of the user web browser 500 [S2], and the user web browser 500 requests the authentication from the AA module 302 of the AA server 300. The AA module 302 of the AA server 300 refers the schema provider 310 to the authority [S4], the schema provider 310 refers the authority information storing module 400 to the site [S5] and delivers the referred result to the user provider 312. The user provider 312 refers the authority information storing module 400 to the user authority to make authentication and set user authority [S6], and transmits the information to the user web browser 500 [S7].

Next, referring the authority will be discussed. In the ACL cache, each the domain web server maintains the ACL related to itself as a cache, refers the user Role to resource text strings of each ACEs, and retrieves text string patterns according to the ACE resource items. This authority referring is detailed in FIGS. 5 and 6.

In FIG. 5, a user requests the page (URL) access from the domain web server 100, Role value (or Role code) is extracted from the AA cookie (for instance, Role=A8:Bf:03). The domain web server 100 checks the user authority: first, it extracts ACE ID of the access resource from the ACL cache in order to check whether the ACE ID of access resource exists in the user Role, and then, if the ACE ID exists in the user Role, grants the access authority.

The functional process is reexamined through FIG. 6. In FIG. 6, if a user accesses the domain web server 100 [S1], the AA module 102 of the domain web server 100 checks the authority [S2], and the resource request processing module 108 processes the request [S3] and responses to the user web browser by sending the processed result [S4].

Next, changing the user authority will be discussed. FIG. 7 shows a flow of enlisting the service, and FIG. 8 shows a flow of quitting the service. In FIG. 7, if a user requests the service enlisting, the domain web server sends the user ID and the Role code to the AA server, and the AA server adds the Role code to the user attributes. Reversely, if a user requests the service quitting, the domain web server sends the user ID and the Role code to the AA server, and the AA server removes the Role code from the user attributes.

As a functional process, with reference to FIG. 9, the user web browser 500 requests the service enlisting or quitting [S1], the resource request processing module 108 of the domain web server 100 request the AA module 302 of the AA server to enlisting/quitting [S2] and the AA module 302 changes the user authority information and send the information to the user provider 312 [S3]. The user provider 312 updates the user information by sending the changed information to the authority information storing module 400 [S4]. At this time, the AA module 302 reports to the resource request processing module 108 that the user information was changed [S5]. Then, the user is informed that the enlisting/quitting process is completed [S6].

In the mean time, synchronization of the ACL cache that is essential for this invention, is explained as follows. The ACL cache is needed when each the domain web serves refers to the Role when in user's access request. The domain web server possesses the dedicated ACL cache in itself in order not to additionally communicate the AA server when referring. A cache is an application variable (i.e., a variable shared by all clients using the application) which resides in a memory of the web server.

Each of the domain web server keeps this ACL cache. Therefore, when the AA server updates the ACL, synchronization problem occurs between the ACL cache and the domain web servers. This problem can be solved by the process shown in FIG. 10 to 13.

FIG. 10 shows an initiating procedure. Whenever the domain web server is started, the ACL cache is initiated from the AA server. That is, when the domain web server is started, it requests the ACL cache from the AA server, and the AA server refers the authority information storing module to a newest ACL and responses to the domain web server by delivering the referred information to it. Functionally, referring to FIG. 11, if the AA module 102 of the domain web server 100 requests the ACL cache control module 306 of the AA server to the ACL cache [S 1], the ACL cache control module 306 refers the ACL cache from the authority information storing module 400 [S2], and delivers the referred data to the AA module 102 of the domain web server 100 [S3].

FIG. 12 shows a synchronization procedure after the ACL cache initialization. In the case of ACL cache addition, deletion, or changing, if the update information is sent to the relevant domain web server, the relevant domain web server updates the cache information in real-time. If the update fails, since the cache update is performed periodically, the newest information may be stored all the time. In FIG. 12, if a supervisor selects the ACL managing through the intranet, the AA server selects a domain web server that the ACL cache will be updated and requests the selected domain web server to the ACL cache update (When requesting, detailed information on ACE is included), and then the domain web server updates the ACL information.

FIG. 13 functionally shows this procedure. A supervisor instructs the ACL cache control module 306 of the AA server to change the authority [S1], the ACL cache control module 306 requests the authority information storing module 400 to ACL change and the ACL cache 104 of the domain web server to cache synchronization. Here, the supervisor means a module for supervising and editing ACE (e.g., ACE addition/deletion, retrieval by the name of an ACE belonged site, a user, an ACE ID, an ACE, etc.) and managing the user Role.

The present invention can solve the conventional problems, that is, 1) extreme network traffic because of a centralized authority management, 2) instability of authority cache, and 3) inefficiency of session management. Especially, the present invention is preferred to be adapted to access control for an extranet for xSP.

While the invention has been shown and described with reference to certain embodiments to carry out this invention, it will be understood by those skilled in the art that various changes in form and details may be made therein without departing from the spirit and scope of the invention as defined by the appended claims.

What is claimed is:

1. An apparatus for managing access for an extranet, comprising:
   a plurality of domain web server, to which a plurality of users are subscribed,
   an authentication and authorization (AA) server for managing access authentication and authorization for the domain web server,
   an authority information storing module for storing authentication information and authorization information of the users, and
   a user web browser interconnected with the AA server and the domain web server,
   wherein the AA server comprises:
     an AA module for authenticating the users and setting Role values in an AA cookie of the authenticated user;
     an access control list (ACL) cache control module for synchronizing ACL caches of the respective domain web server with the AA server; an encryption module for encrypting the AA cookies to be given to each user; and
     a schema provider and user provider for providing an operation system independent of the authority information storing module,
   wherein the domain web server comprises:
     an ACL cache which is delivered from the AA server;
     an AA module for checking, by using the ACL cache, whether the user has authority to access a requested resource;
     a decryption module for decrypting the encrypted AA cookies; and
     a module for processing a resource request from the user web browser,
   wherein the domain web server is configured to extract the Role values from the AA cookie of the user, extracts an access control entry (ACE) of the requested resource from the ACL cache, and grant an access authority to the user if the ACE of the requested resource exists in the extracted Role values.

2. A method of managing access for an extranet, performed in the apparatus which comprises the elements in claim 1, the method comprising the steps of:
   an ACL initialization operation comprising:
     an AA module of a domain web server requesting the ACL cache control module of the AA server to synchronize an ACL; and
     the ACL cache control module referring the ACL from the authority information storing module and delivering the referred ACL data to the AA module of the domain web server;
   an authorizing operation in authentication comprising:

a user web browser accessing the domain web server;

the AA module of the domain web server confirming access authority of the user web browser;

the user web browser requesting the authentication from an AA module of the AA server;

the AA module of the AA server referring a schema provider to the authority;

the schema provider referring an authority information storing module to a site and delivering the referred result to a user provider; and the user provider referring the authority information storing module to the user authority to make authentication, setting Role values in an AA cookie of the authenticated user, and transmitting the AA cookie to the user web browser; and an authority referring operation comprising:

a user web browser requesting a page (URL) access from the domain web server;

the AA module of the domain web server checking whether the user has an authority to access the requested page by comparing the Role values in the AA cookie and ACEs of the ACL cache; and the resource request processing module processing the requested page (URL) and responses to the user web browser by sending a processed result.

3. The method of claim 2, further comprising a user authority changing step comprising:

if the user web browser requests the service enlisting or quitting, the resource request processing module of the domain web server requesting the AA module of the AA server to enlisting/quitting, the AA module of the AA server changing the user authority information and sending the information to the user provider, the user provider updating the user information by sending the changed information to the authority information storing module, the AA module of the AA server reporting to the resource request processing module that the user information was changed, such that the user is informed that the enlisting/quitting process is completed.

4. The method of claim 2, further comprising:

an ACL synchronization operation comprising:

a supervisor instructing the ACL cache control module of the AA server to change the authority; and the ACL cache control module requesting the authority information storing module to change the ACL, and the ACL cache of the domain web server to synchronize the ACL cache.

* * * * *